(12) United States Patent  
Sakamoto et al.

(10) Patent No.: US 10,600,446 B2  
(45) Date of Patent: Mar. 24, 2020

(54) VIDEO REPRODUCING DEVICE, VIDEO REPRODUCING METHOD, AND PROGRAM

(71) Applicant: Mitsubishi Hitachi Power Systems, Ltd., Kanagawa (JP)

(72) Inventors: Kenshi Sakamoto, Yokohama (JP); Hiroyuki Matsuoka, Takasago (JP); Keigo Fujiwara, Takasago (JP); Minoru Nakanishi, Kobe (JP); Masashi Yamamoto, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/078,756

(22) PCT Filed: Feb. 14, 2017

(86) PCT No.: PCT/JP2017/005314  
§ 371 (c)(1),  
(2) Date: Aug. 22, 2018

(87) PCT Pub. No.: WO2017/150173  
PCT Pub. Date: Sep. 8, 2017

(65) Prior Publication Data  
US 2019/0057724 A1 Feb. 21, 2019

(30) Foreign Application Priority Data

Feb. 29, 2016 (JP) .................. 2016-038356

(51) Int. Cl.  
*G11B 27/10* (2006.01)  
*H04N 5/92* (2006.01)  
(Continued)

(52) U.S. Cl.  
CPC ............... *G11B 27/10* (2013.01); *G09B 9/00* (2013.01); *H04N 5/44591* (2013.01);  
(Continued)

(58) Field of Classification Search  
CPC .................................. G11B 27/10; G09B 9/00  
See application file for complete search history.

(56) References Cited

U.S. PATENT DOCUMENTS

2010/0208082 A1* 8/2010 Buchner ............... H04H 20/18  
348/207.1  
2011/0080425 A1 4/2011 Kim et al.

FOREIGN PATENT DOCUMENTS

JP          6-20180       1/1994  
JP          10-268744     10/1998  
(Continued)

OTHER PUBLICATIONS

International Search Report dated Apr. 11, 2017 in International (PCT) Application No. PCT/JP2017/005314.  
(Continued)

*Primary Examiner* — Girumsew Wendmagegn  
(74) *Attorney, Agent, or Firm* — Wenderoth, Lind & Ponack, L.L.P.

(57) ABSTRACT

A reproduction unit synchronously reproduces different videos recorded in the same time zone on each of a main pane and a sub pane of which a size is smaller than a size of the main pane of a reproduction screen having the main pane and the sub pane. A reproduction switching unit switches the video reproduced on the main pane to the video reproduced on the sub pane during a reproduction of the video by the reproduction unit.

8 Claims, 10 Drawing Sheets

(51) Int. Cl.
*G09B 9/00* (2006.01)
*H04N 21/472* (2011.01)
*H04N 5/93* (2006.01)
*H04N 5/445* (2011.01)

(52) U.S. Cl.
CPC ............... *H04N 5/92* (2013.01); *H04N 5/93* (2013.01); *H04N 21/472* (2013.01)

(56) References Cited

FOREIGN PATENT DOCUMENTS

| | | |
|---|---|---|
| JP | 2004-139234 | 5/2004 |
| JP | 2007-129332 | 5/2007 |
| JP | 2007-334136 | 12/2007 |
| JP | 2011-82982 | 4/2011 |
| JP | 2012-244388 | 12/2012 |
| JP | 5230668 | 7/2013 |
| JP | 2014-77896 | 5/2014 |
| JP | 2015-75732 | 4/2015 |
| KR | 10-2011-0037824 | 4/2011 |
| WO | 2015/053266 | 4/2015 |

OTHER PUBLICATIONS

Written Opinion of the International Searching Authority dated Apr. 11, 2017 in International (PCT) Application No. PCT/JP2017/005314 with English translation.

\* cited by examiner

VIDEO REPRODUCING DEVICE, VIDEO REPRODUCING METHOD, AND PROGRAM

TECHNICAL FIELD

The present invention relates to a video reproduction device, a video reproduction method, and a program that reproduce a plurality of videos.

Priority is claimed on Japanese Patent Application No. 2016-038356, filed Feb. 29, 2016, the content of which is incorporated herein by reference.

BACKGROUND ART

A driver who drives a facility such as a plant needs to receive training on the driving of the facility for continuous driving of the facility. As methods of training, there are a method of causing a trainee to operate a simulator that simulates the facility and a method of causing the trainee to observe model driving by an instructor. In a case where the trainee is caused to observe the model driving by the instructor, it is necessary to match a schedule of training to a schedule of the instructor and the trainee, and it is impossible to instantly implement whenever the trainee demands the training. Particularly, in a case where there are a plurality of trainees, it is difficult to appropriately decide the schedule of the training.

Therefore, a training method in which model driving by an instructor is recorded and a trainee is caused to observe a recorded video is considered (refer to Patent Document 1). According to the method disclosed in Patent Document 1, since the trainee is able to receive the training by observing the model driving that is recorded in advance, the trainee is able to receive the training regardless of the schedule of the instructor.

CITATION LIST

Patent Document

[Patent Document 1] Japanese Patent No. 5230668

SUMMARY OF INVENTION

Technical Problem

In a facility, a plurality of devices for driving the facility are provided. Examples of the devices for driving the facility include a monitoring device that monitors a state of equipment provided in the facility, a control device that controls the equipment that is operated by an electrical control, and equipment requiring a physical operation. Therefore, for training, it is preferable to use a plurality of videos representing the state of each device.

However, in a case where a plurality of display devices for displaying each video are provided in a training device, costs of the training device increase. In a training system described in Patent Document 1, a screen of one display device is divided into a plurality of areas and each video is displayed in one of the areas. Therefore, it is possible to reduce the cost of the system. On the other hand, since a size of each area and images displayed in each area are fixed, a user is not able to observe the image displayed in a small area in detail.

An object of the present invention is to provide a video reproduction device, a video reproduction method, and a program capable of enabling a user to observe each of a plurality of videos in detail.

Solution to Problem

According to a first aspect of the present invention, a video reproduction device includes a reproduction unit configured to synchronously reproduce different videos recorded in the same time zone on each of a main pane and a sub pane with a smaller size than the main pane of a reproduction screen having the main pane and the sub pane, and a reproduction switching unit configured to switch the video reproduced on the main pane to the video reproduced on the sub pane during reproduction of the video by the reproduction unit.

According to a second aspect of the present invention, in the video reproduction device according to the first aspect, the reproduction switching unit may switch the video on the basis of switching setting data that associates a reproduction position at which the video reproduced on the main pane is switched to the video reproduced on the sub pane with the video that is a target of switching.

According to a third aspect of the present invention, the video reproduction device according to the first or second aspect may further include a reproduction position change unit configured to change the reproduction position of the video reproduced on the main pane and the video reproduced on the sub pane by the reproduction unit to a designated reproduction position.

According to a fourth aspect of the present invention, in the video reproduction device according to the third aspect, the video may be a video obtained by capturing an execution screen of a simulator, and the reproduction position change unit may change the reproduction position of the video reproduced on the main pane and the video reproduced on the sub pane by the reproduction unit to a reproduction position corresponding to a time at which the simulator outputs predetermined log data.

According to a fifth aspect of the present invention, in the video reproduction device according to any one of the first to fourth aspects, the video may include a video obtained by capturing operation screen of the simulator.

According to a sixth aspect of the present invention, in the video reproduction device according to the fourth or fifth aspect, a pointer related to operation of the simulator may be displayed on the reproduction screen.

According to a seventh aspect of the present invention, the video reproduction device according to any one of the first to sixth aspects may further include a switching permission or prohibition setting unit configured to set whether or not to switch the video by the reproduction switching unit, and in a case where the switching permission or prohibition setting unit sets prohibition of the switching, the reproduction switching unit may not switch between the video reproduced on the main pane and the video reproduced on the sub pane.

According to an eighth aspect of the present invention, the video reproduction device according to any one of the first to seventh aspects may further include a switching instruction input unit configured to receive an input of a switching instruction of the video by a user, and when the switching instruction is input to the switching instruction input unit, the reproduction switching unit may switch between the video reproduced on the main pane and the video reproduced on the sub pane.

According to a ninth aspect of the present invention, in the video reproduction device according to any one of the first to eighth aspects, the reproduction unit may reproduce the video on the basis of speed setting data that associates a reproduction position at which a reproduction speed of the video reproduced on the main pane and the video reproduced on the sub pane is changed with a reproduction speed after the change.

According to a tenth aspect of the present invention, the video reproduction device according to any one of the first to ninth aspects may further include a reproduction position correction unit configured to correct the reproduction position of the video reproduced on the sub pane to the reproduction position of the video reproduced on the main pane.

According to an eleventh aspect of the present invention, the video reproduction device according to any one of the first to tenth aspects may further include an information suggestion unit configured to suggest information during the reproduction of the video by the reproduction unit on the basis of suggestion setting data that associates the suggested information with a reproduction position suggesting the information.

According to a twelfth aspect of the present invention, a video reproduction method includes synchronously reproducing different videos recorded in the same time zone on each of a main pane and a sub pane with a smaller size than the main pane of a reproduction screen having the main pane and the sub pane, and switching the video reproduced on the main pane to the video reproduced on the sub pane during reproduction of the video.

According to a thirteenth aspect of the present invention, a program causes computer to execute synchronously reproducing different videos recorded in the same time zone on each of a main pane and a sub pane with a smaller size than the main pane of a reproduction screen having the main pane and the sub pane, and switching the video reproduced on the main pane to the video reproduced on the sub pane during reproduction of the video.

Advantageous Effects of Invention

According to at least one aspect among the above-described aspects, the video reproduction device switches the video reproduced on the main pane to the video reproduced on the sub pane. Therefore, it is possible to enable a user to observe each video in detail by reproducing each video reproduced on the sub pane on the main pane.

DESCRIPTION OF EMBODIMENTS

First Embodiment

Hereinafter, an embodiment will be described in detail with reference to the drawings.

Figure 1:
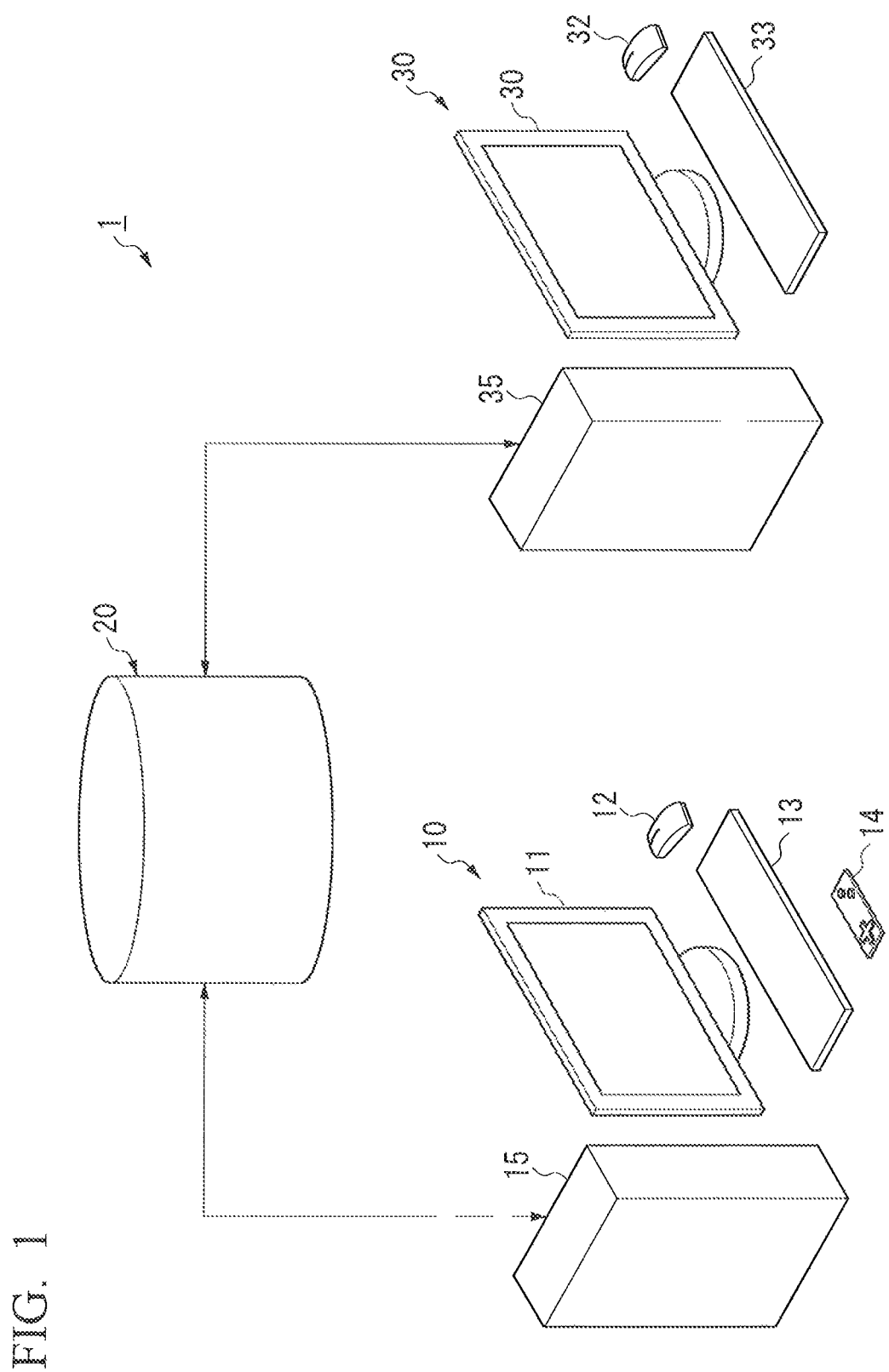
FIG. 1 is a schematic diagram showing a constitution of a training system according to a first embodiment.

FIG. 1 is a schematic diagram showing a constitution of a training system according to the first embodiment.

The training system 1 is a system that enables a trainee to observe an operation of a simulator of a plant by an instructor. The training system 1 includes an instructor terminal 10, a database 20, and a trainee terminal 30.

The instructor terminal 10 has a function of a plant simulator. The instructor terminal 10 records the operation of the simulator by the instructor and records training data including the recorded video in the database 20.

The database 20 stores the training data generated by the instructor terminal 10. The trainee terminal 30 receives the training data from the database 20 and reproduces the video included in the training data.

The instructor terminal 10 and the trainee terminal 30 are examples of a video reproduction device.

The instructor terminal 10 includes a display device 11, a mouse 12, a keyboard 13, a joy pad 14, and a terminal main body 15.

The display device 11 displays an arithmetic calculation result by the terminal main body 15.

The mouse 12, the keyboard 13, and the joy pad 14 are input devices that receive input operations by the instructor to the terminal main body 15.

The terminal main body 15 performs an arithmetic calculation according to the inputs of the mouse 12, the keyboard 13, and the joy pad 14, and displays the arithmetic calculation result on the display device 11.

The trainee terminal 30 includes a display device 31, a mouse 32, a keyboard 33, and a terminal main body 35.

The display device 31 displays an arithmetic calculation result of the terminal main body 35.

The mouse 32 and the keyboard 33 are input devices that receive input operations by the trainee to the terminal main body 35.

The terminal main body 35 performs an arithmetic calculation according to the inputs of the mouse 32 and the keyboard 33, and displays the arithmetic calculation result an the display device 31.

<<Constitution of Instructor Terminal>>

Figure 2:
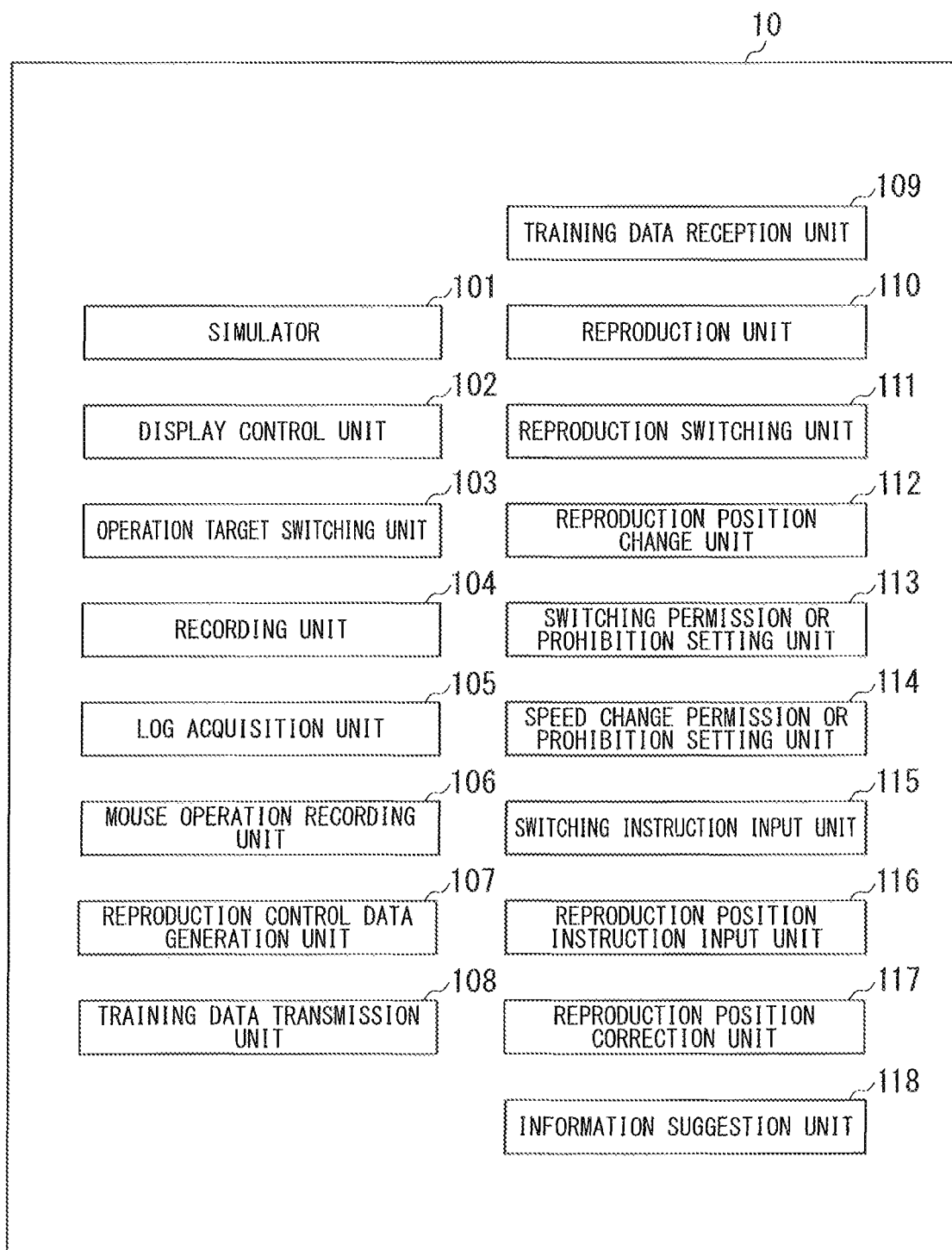
FIG. 2 is a schematic block diagram showing a software constitution of an instructor terminal according to the first embodiment.

FIG. 2 is a schematic block diagram showing a software constitution of the instructor terminal according to the first embodiment.

The instructor terminal 10 includes a simulator 101, a display control unit 102, an operation target switching unit 103, a recording unit 104, a log acquisition unit 105, a mouse operation recording unit 106, a reproduction control data generation unit 107, a training data transmission unit 108, a training data reception unit 109, a reproduction unit 110, a reproduction switching unit 111, a reproduction position change unit 112, a switching permission or prohibition setting unit 113, a speed change permission or prohibition setting unit 114, a switching instruction input unit 115, a reproduction position instruction input unit 116, a reproduction position correction unit 117, and an information suggestion unit 118.

The simulator 101 simulates the operation of the plant. Specifically, the simulator 101 executes a plant model application, a walk-through application, an emulator application, and a console application.

The plant model application is an application for simulating a state of a virtual plant by the arithmetic calculation. Hereinafter, the plant simulated by the plant model application is referred to as a virtual plant. The plant model application receives an input of operation content from the walk-through application and the emulator application, and performs the arithmetic calculation of the state of the virtual plant on the basis of the operation content. In addition, the plant model application is an application executed in the background and does not have an execution screen.

The walk-through application is an application for reproducing a three-dimensional model of the virtual plant and an avatar of a user in the virtual plant and simulating movement in the virtual plant by the avatar. The instructor is able to operate the avatar by operation of the joy pad 14. In addition, the simulator 101 simulates operation of equipment reproduced by the three-dimensional model in the vicinity of the avatar by executing the walk-through application. The instructor is able to operate the equipment by operations of the mouse 12 and the keyboard 13. The operation content of the plant by the walk-through application is input to the plant model application.

The emulator application is an application that emulates a monitoring device that displays the operation state of the virtual plant. The monitoring device is a device that displays driving states of each piece of equipment of the virtual plant and remotely controls each piece of equipment. The operation content for the emulator application is input to the plant model application.

The console application is an application for causing the simulator 101 to execute the plant model application, the walk-through application, and the emulator application. Specifically, the simulator 101 activates the plant model application, the walk-through application, and the emulator application according to operation for the console application.

The display control unit 102 displays a simulation result by the simulator 101 on the display device 11. Specifically, the display control unit 102 displays an execution screen of the walk-through application, an execution screen of the emulator application, and an execution screen of the console application on the display device 11. In addition, the display control unit 102 displays a reproduction result of the training data by the reproduction unit 110 on the display device 11.

Figure 3:
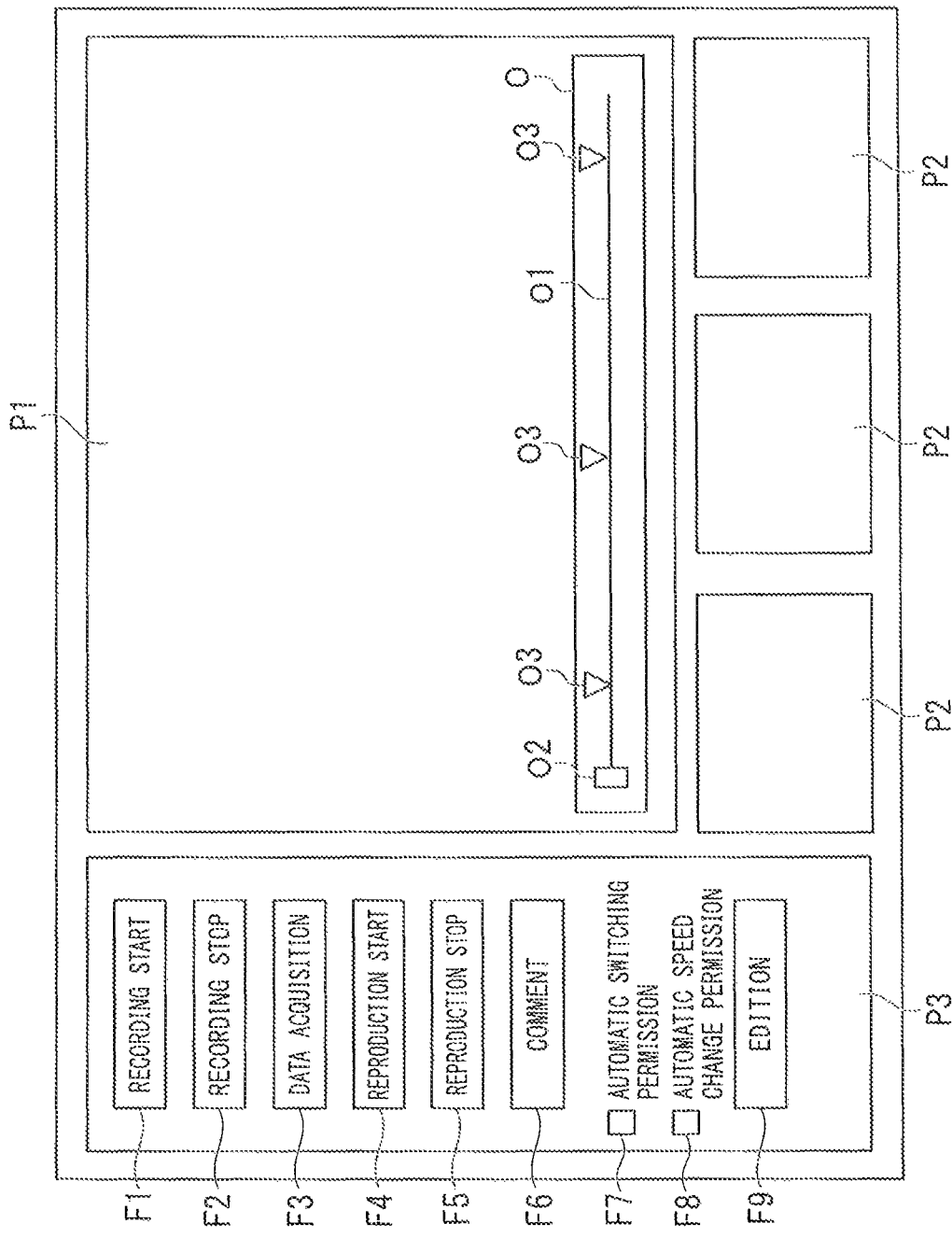
FIG. 3 is a diagram showing an example of an operation screen displayed on a display device of the instructor terminal according to the first embodiment.

FIG. 3 is a diagram showing an example of an operation screen displayed on the display device of the instructor terminal according to the first embodiment.

An operation screen (a reproduction screen) including a main pane P1, a plurality of sub panes P2, an operation pane P3, and a seek bar O is displayed on the display device 11. The main pane P1 and the sub pane P2 are areas for displaying the execution screen of the application by the simulator 101. The size of the sub pane P2 is smaller than the size of the main pane P1. The operation pane P3 is an area where a user interface for operating the recording and reproduction of the video is displayed. The seek bar O has a time line O1 indicating a total reproduction time of the video, a reproduction head O2 indicating a reproduction position, and a chapter mark O3 indicating a jump destination of the video. In addition, the seek bar O is displayed only in a case where the reproduction result of the training data is displayed on the display device 11.

In the operation pane P3, a recording start button F1, a recording stop button F2, a data acquisition button B3, a reproduction start button F4, a reproduction stop button F5, a comment button F6, an automatic switching permission check box F7, an automatic speed change permission check box F8, and an editing button F9 are included. The recording start button F1 is a button for starting the recording of the execution screen of the application executed by the simulator 101. The recording stop button F2 is a button for stopping the recording of the execution screen of the application executed by the simulator 101. The data acquisition button B3 is a button for receiving the training data from the database 20. The reproduction start button F4 is a button for starting the reproduction of the training data received from the database 20. The reproduction stop button F5 is a button for stopping the reproduction of the training data. The comment button F6 is a button for adding a comment to the training data. The automatic switching permission check box F7 is a check box for setting whether or not to permit automatic switching of the video reproduced an the main pane P1 on the basis of the training data. The automatic speed change permission check box F8 is a check box for setting whether or not to permit automatic switching of a reproduction speed of the video on the basis of the training data. The editing button F9 is a button for editing the training data.

The operation target switching unit 103 switches an operation target among the applications executed by the simulator 101 on the basis of the operation of the mouse 12 of the instructor. Specifically, the operation target switching unit 103 sets the application displayed on the execution screen that is displayed on the sub pane P2 selected by the operation of the mouse 12 as the operation target. In addition, the application that is set to the operation target is displayed on the main pane P1. That is, in a case where the sub pane P2 is selected by the operation of the mouse 12, the execution screen displayed on the sub pane P2 is reproduced on the main pane P1. At this time, on the sub pane P2, the same video may be continuously reproduced, the video displayed on the main pane P1 may be reproduced, and a filler image may be displayed.

The recording unit 104 records execution screens of each application by the simulator 101. That is, the recording unit 104 obtains the video by capturing the execution screen. Specifically, the recording unit 104 generates each of the video of the execution screen of the walk-through application, the video of the execution screen of the emulator application, and the video of the execution screen of the console application. That is, the recording unit 104 generates different videos recorded in the same time zone.

The log acquisition unit 105 acquires an event log generated by the simulator 101. The event log is information configured of a plurality of tuple that associates an event occurring in the virtual plant with a time at which the event occurs. That is, each tuple of the event log is log data output from the simulator 101 at different times. Examples of the event include an operation of the virtual plant on the walk-through application, an operation of the virtual plant on the emulator application, and an alarm from the monitoring device of the virtual plant. The mouse operation recording unit 106 records an operation history (a cursor trajectory and a click timing) of the mouse 12 by the instructor.

The reproduction control data generation unit 107 generates reproduction control data for controlling the reproduction of the video recorded by the recording unit 104. The reproduction control data is configured of switching setting data, suggestion setting data, speed setting data, trimming setting data, and chapter setting data.

The switching setting data is data configured of a tuple that associates identification information of the video reproduced on the main pane P1 with the reproduction position for reproducing the video on the main pane P1. Here, the reproduction position indicates a reproduction elapsed time from a head of the video. The suggestion setting data is data configured of a tuple that associates information suggested together with the video, the reproduction position at which the information is to be suggested, and a kind of the information with one another. The kind of the information includes a "comment" indicating the information suggested by a character string on the main pane P1, and a "narration" indicating information reproduced by sound synthesis. The speed setting data is data configured of a tuple that associates the reproduction position at which a change of the reproduction speed of the video is started with the reproduction speed after the change. The trimming setting data is data configured of a tuple that associates the reproduction position (a start position) at which trimming of the video is started with the reproduction position (an end position) at which the trimming is ended. The chapter setting data is data configured of a tuple that associates the reproduction position of the video with the character string that explains the reproduction position.

The training data transmission unit 108 transmits the video recorded by the recording unit 104, the event log acquired by the log acquisition unit 105, the operation history of the mouse 12 recorded by the mouse operation recording unit 106, and the reproduction control data generated by the reproduction control data generation unit 107 to the database 20 in association with one another as training data.

The training data reception unit 109 receives the training data from the database 20. The training data is the data transmitted by the training data transmission unit 108 in the past.

The reproduction unit 110 synchronously reproduces each of a plurality of videos included in the training data received by the training data reception unit 109 on the main pane P1 and the sub pane P2. The video reproduced by the reproduction unit 110 is displayed on the display device 11 by the display control unit 102. In addition, the reproduction unit 110 reproduces the video at a speed according to the speed setting data included in the training data. Specifically, when the reproduction position of the video during the reproduction reaches the reproduction position stored in the speed setting data, the reproduction unit 110 changes the reproduction speed of the video to a reproduction speed associated with the reproduction position.

The reproduction switching unit 111 switches the video reproduced on the main pane P1 on the basis of the switching setting data included in the training data. Specifically, when the reproduction position of the video reproduced on the main pane P1 reaches the reproduction position stored in the switching setting data, the reproduction switching unit 111 switches the video reproduced on the main pane P1 to a video indicating the identification information associated with the reproduction position among the videos reproduced on the sub pane P2. In addition, the reproduction switching unit 111 switches the video reproduced on the main pane P1 according to a switching instruction input to the switching instruction input unit 115.

The reproduction position change unit 112 changes the reproduction position of the video reproduced by the reproduction unit 110 according to a reproduction position instruction input to the reproduction position instruction input unit 116.

The switching permission or prohibition setting unit 113 sets permission or prohibition of automatic switching of the video according to the switching setting data, in accordance with the input by the instructor to the automatic switching permission check box F7. That is, in a case where the prohibition of the automatic switching is set by the switching permission or prohibition setting unit 113, the reproduction switching unit 111 does not execute the switching of the video based on the switching setting data and executes only the switching according to the switching instruction input to the switching instruction input unit 115.

The speed change permission or prohibition setting unit 114 sets permission or prohibition of the automatic change of the reproduction speed according to the speed setting data, in accordance with the input by the instructor to the automatic speed change permission check box F8. That is, in a case where the prohibition of the automatic change is set by the speed change permission or prohibition setting unit 114, the reproduction unit 110 does not change the reproduction speed based on the speed setting data.

The switching instruction input unit 115 receives the input of the switching instruction for designating the video displayed on the main pane P1 on the basis of the input of the instructor. Specifically, the switching instruction input unit 115 receives the designation of the sub pane P2 by the mouse 12 to receive the input of the switching instruction for reproducing the video reproduced on the designated sub pane P2 on the main pane P1. The reproduction position instruction input unit 116 receives the input of the reproduction position instruction for designating the reproduction position of the video on the basis of the input of the instructor. Specifically, the reproduction position instruction input unit 116 receives a designation of the chapter mark O3 indicating the reproduction position that is able to be jumped to by the mouse 12 to receive the input of the reproduction position instruction that changes the reproduction position of the video to a reproduction position corresponding to the designated chapter mark O3.

The reproduction position correction unit 117 corrects the reproduction positions of each video reproduced on the sub pane P2 to the reproduction positions of the videos reproduced on the main pane P1 at every predetermined period (for example, 10 seconds).

The information suggestion unit 118 suggests information to the instructor on the basis of the suggestion setting data included in the training data. Specifically, when the reproduction position of the video reproduced by the reproduction unit 110 reaches the reproduction position of the suggestion setting data, the information suggestion unit 118 suggests the information associated with the reproduction position in a mode corresponding to the associated kind.

<<Operation of Instructor Terminal>>

The operation of the instructor terminal 10 will be described. First, generation processing of the training data by the instructor terminal 10 will be described.

Figure 4:
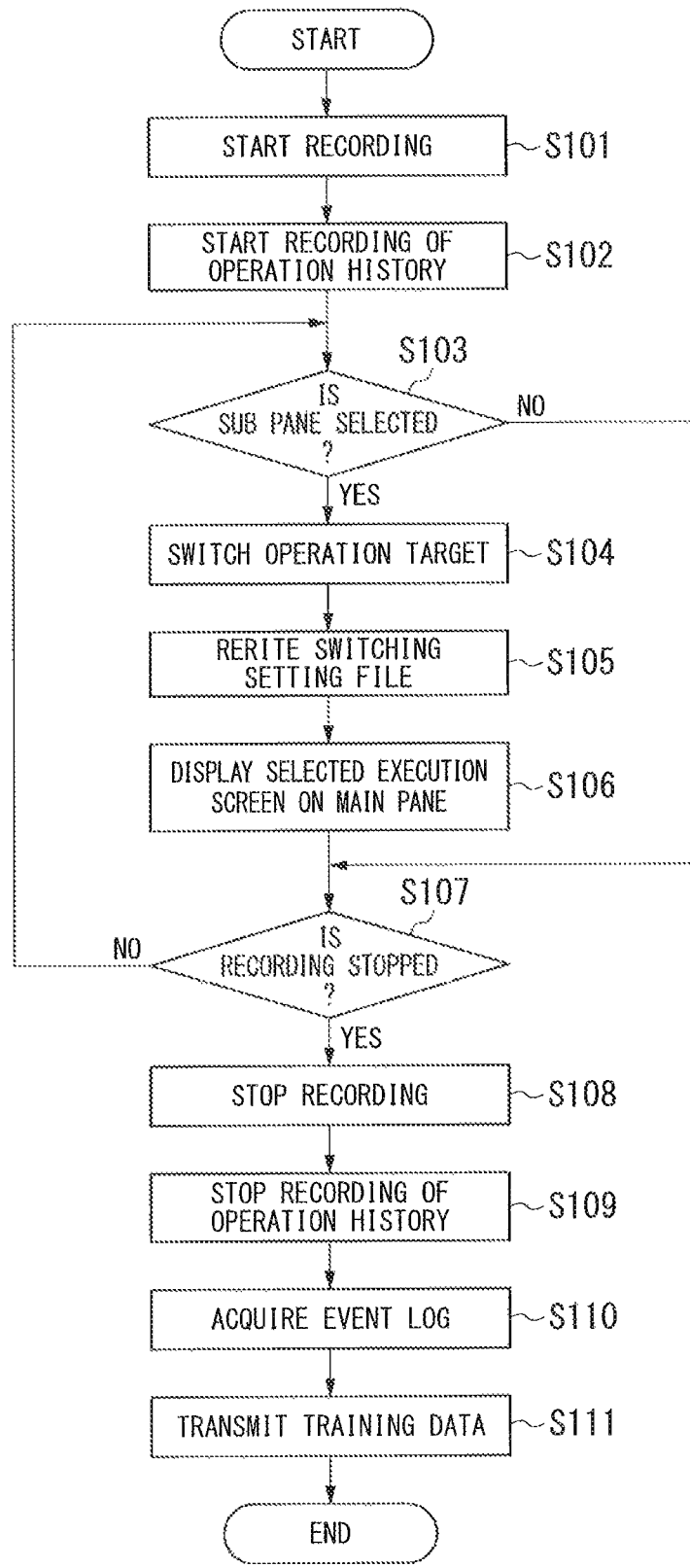
FIG. 4 is a flowchart showing generation processing of training data according to the first embodiment.

FIG. 4 is a flowchart showing the generation processing of the training data according to the first embodiment. In a case where the instructor presses a recording start button F1 of the instructor terminal 10 by the operation of the mouse 12, the recording unit 104 starts the recording of the execution screen of each application executed by the simulator 101 (step S101). In addition, the mouse operation recording unit 106 starts the recording of the operation history of the mouse 12 by the instructor (step S102). Next, the operation target switching unit 103 determines whether or not the sub pane P2 is selected by the operation of the mouse 12 (step S103). In a case where the sub pane P2 is selected (step S103: YES), the operation target switching unit 103 switches the application related to the execution screen reproduced on the selected sub pane P2 to an application that is operated by the mouse 12, the keyboard 13, and the joy pad 14 (step S104). The reproduction control data generation unit 107 adds the tuple that associates the elapsed time from the start of the recording with the identification information of the application displayed on the selected sub pane to the switching setting data (step S105). In addition, the display control unit 102 displays the execution screen displayed on the selected sub pane P2 on the main pane P1 (step S106).

In a case where the sub pane P2 is not selected by the operation of the mouse 12 (step S103: NO) or in a case where the execution screen displayed on the main pane P1 is changed in step S106, the recording unit 104 determines whether or not a recording stop button F2 is pressed by the operation of the mouse 12 (step S107). In a case where the recording stop button F2 is not pressed (step S107: NO), the instructor terminal 10 returns to the processing of step S103 and determines whether or not the sub pane P2 is selected.

In addition, during this time, the operation in the main pane P1 among the operations of the keyboard 13, the joy pad 14, and the mouse 12 is input to the application that is the operation target by the operation target switching unit 103. Therefore, the instructor drives the virtual plant realized by the plant model application.

On the other hand, when the recording stop button F2 is pressed (step S107: YES), the recording unit 104 stops the recording of each execution screen (step S108). In addition, the mouse operation recording unit 106 stops the recording of the operation history of the mouse 12 (step S109). Next, the log acquisition unit 105 acquires an event log generated from the recording start time to the recording stop time from the simulator 101 (step S110). In addition, the training data transmission unit 108 transmits the video recorded by the recording unit 104, the event log acquired by the log acquisition unit 105, the operation history of the mouse 12 recorded by the mouse operation recording unit 106, and the switching setting data generated by the reproduction control data generation unit 107 to the database 20 in association with each other as the training data (step S111).

With the processing described above, the instructor terminal 10 may record the training data in the database 20.

Next, editing processing of the training data by the instructor terminal 10 will be described.

The editing processing of the training data is executed after the training data is generated by the generation processing of the training data described above or after the training data reception unit 109 receives the training data from the database 20 by the pressing of the data acquisition button B3 by the operation of the mouse 12.

Figure 5:
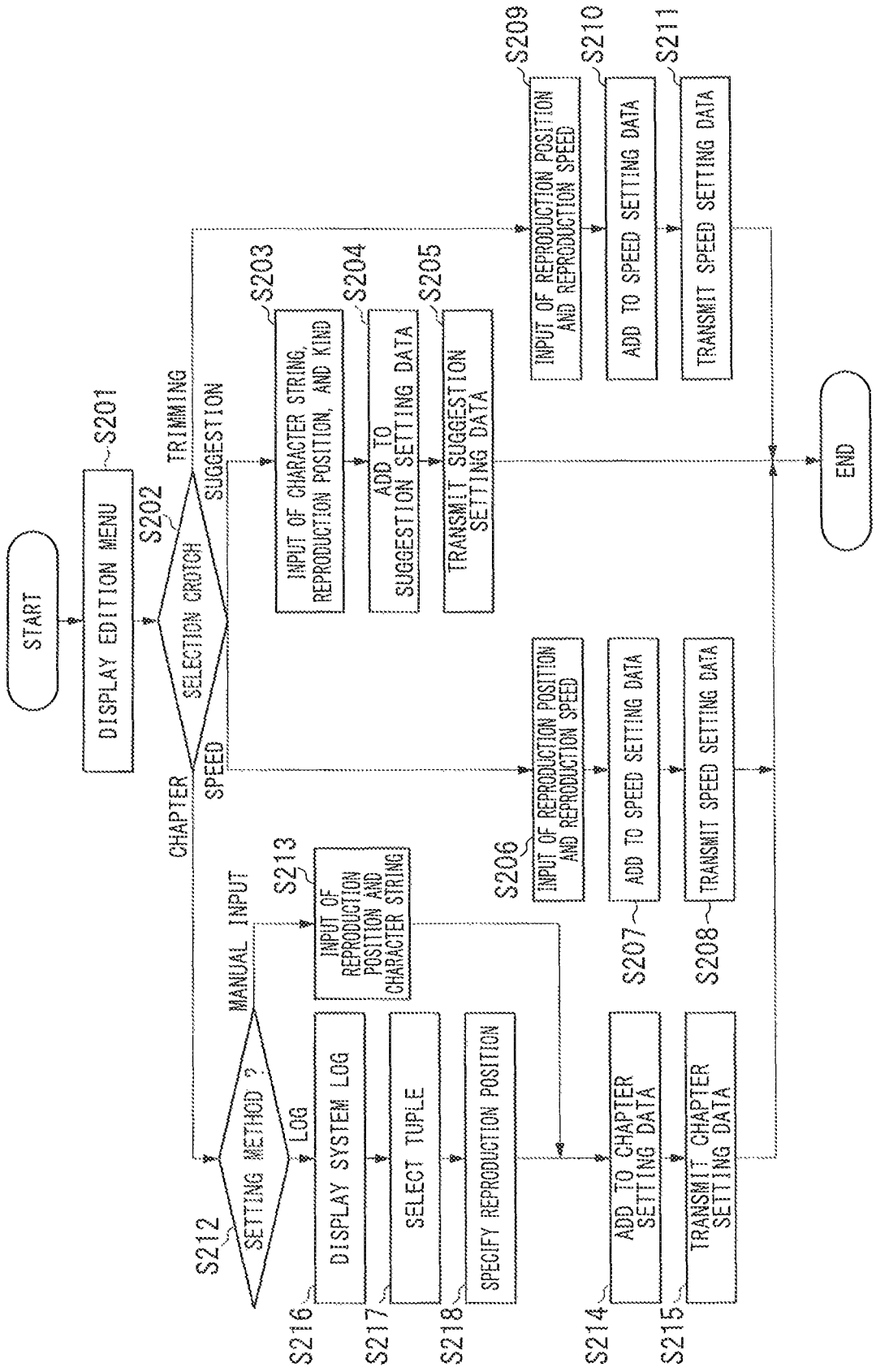
FIG. 5 is flowchart showing editing processing of the training data according to the first embodiment.

FIG. 5 is flowchart showing the editing processing of the training data according to the first embodiment. In a case where the instructor presses an editing button F9 of the instructor terminal 10 by the operation of the mouse 12, the display control unit 102 displays an editing menu including a selection item of the reproduction control data that is an editing target on the display device 11 (step S201). The selection item includes the suggestion setting data, the speed setting data, the trimming setting data, and the chapter setting data. The reproduction control data generation unit 107 receives a selection of the selection items by the operation of the mouse 12 (step S202).

In a case where the editing of the suggestion setting data is selected (step S202: suggestion), the reproduction control data generation unit 107 receives the inputs of the character string indicating information to be suggested, the reproduction position to be suggested, and the kind to be suggested by the operations of the mouse 12 and the keyboard 13 (step S203). In a case where the information, the reproduction position, and the kind to be suggested are input, the reproduction control data generation unit 107 adds the input data to the suggestion setting data as a new tuple (step S204). In addition, the training data transmission unit 108 transmits the suggestion setting data to which the tuple is added to the database 20 (step S205). Therefore, the database 20 may update the suggestion setting data.

In a case where the editing of the speed setting data is selected (step S202: speed), the reproduction control data generation unit 107 receives the inputs of the reproduction position at which the change of the reproduction speed of the video is started and the reproduction speed after the change by the operations of the mouse 12 and the keyboard 13 (step S206). In a case where the reproduction position and the reproduction speed are input, the reproduction control data generation unit 107 adds the input data to the speed setting data as a new tuple (step S207). In addition, the training data transmission unit 108 transmits the speed setting data to which the tuple is added to the database 20 (step S208). Therefore, the database 20 may update the speed setting data.

In a case where the editing of the trimming setting data is selected (step S202: trimming), the reproduction control data generation unit 107 receives the inputs of the reproduction position at which the trimming of the video is started and the reproduction position at which the trimming is ended by the operations of the mouse 12 and the keyboard 13 (step S209). In a case where the start position and the end position are input, the reproduction control data generation unit 107 adds the input data to the trimming setting data as a new tuple (step S210). In addition, the training data transmission unit 108 transmits the trimming setting data to which the tuple is added to the database 20 (step S211). Therefore, the database 20 may update the trimming setting data.

In a case where the editing of the chapter setting data is selected (step S202: chapter), the reproduction control data generation unit 107 receives a selection of whether to decide the reproduction position of the jump destination by a manual input or to decide the reproduction position of the jump destination on the basis of the event log (step S212). In a case where the deciding of the reproduction position of the jump destination by the manual input is selected (step S212: manual input), the reproduction control data generation unit 107 receives the inputs of the reproduction position of the jump destination and the character string explaining the reproduction position by the operations of the mouse 12 and the keyboard 13 (step S213). In a case where the reproduction position and the character string are input, the reproduction control data generation unit 107 adds the input data to the chapter setting data as a new tuple (step S214). In addition, the training data transmission unit 108 transmits the chapter setting data to which the tuple is added to the database 20 (step S215). Therefore, the database 20 may update the chapter setting data.

On the other hand, in a case where the deciding of the reproduction position of the jump destination based on the event log is selected (step S212: log), the display control unit 102 displays the event log included in the training data on the display device 11 (step S216). The reproduction control data generation unit 107 receives a selection of a tuple (log data) indicating an event set as the jump destination from the displayed event log (step S217). The reproduction control data generation unit 107 specifies the reproduction position corresponding to the time indicated by the selected tuple (step S218). For example, the reproduction control data generation unit 107 specifies a time difference between the time indicated by the selected tuple and the recording start time as the reproduction position. The reproduction control data generation unit 107 adds the specified reproduction position and a character string indicating the log content of the selected tuple to the chapter setting data as a new tuple (step S214). In addition, the training data transmission unit 108 transmits the chapter setting data to which the tuple is added to the database 20 (step S215).

With the processing described above, the instructor can edit the training data.

Reproduction processing of the training data by the instructor terminal 10 will be described.

The reproduction processing of the training data is executed after the training data is generated by the generation processing of the training data described above or after the training data reception unit 109 receives the training data from the database 20 by the pressing of the data acquisition button B3 by the operation of the mouse 12.

Figure 6:
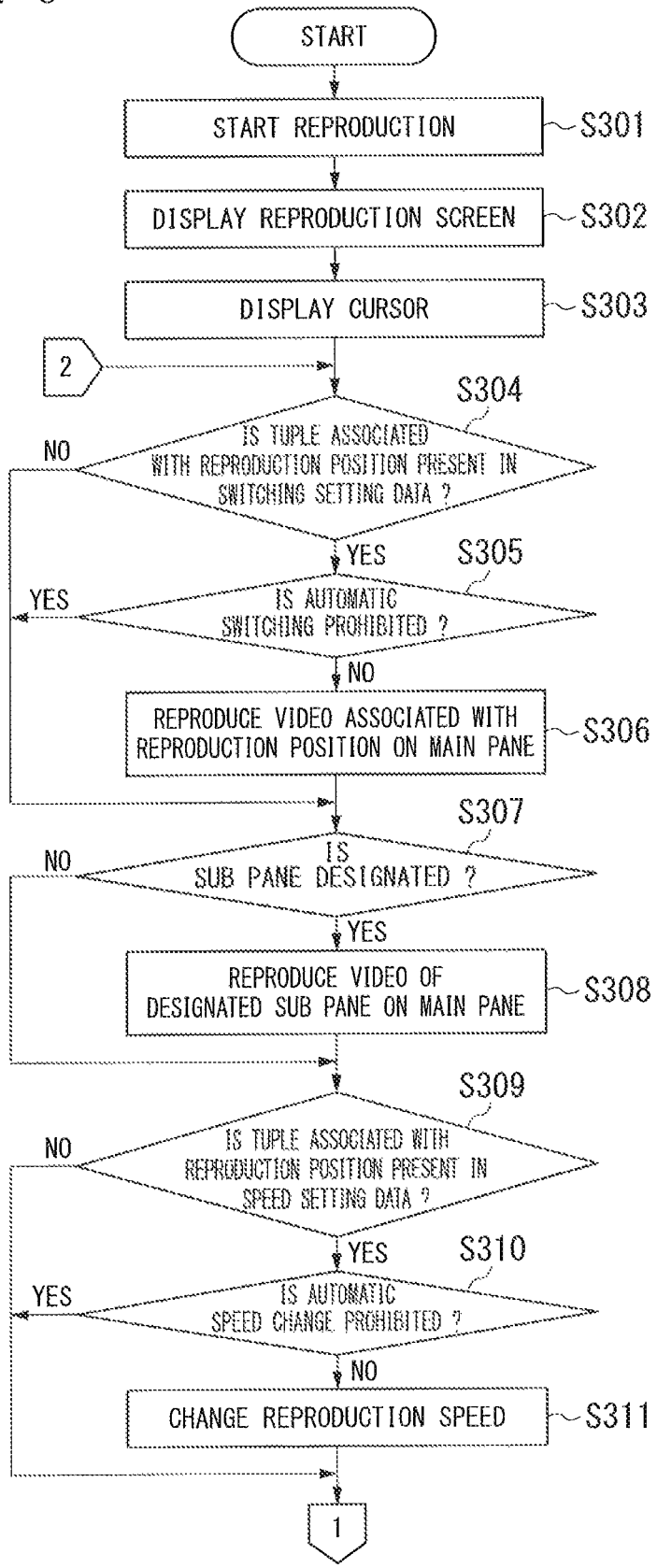
FIG. 6 is a first flowchart showing reproduction processing of the training data according to the first embodiment.
Figure 7:
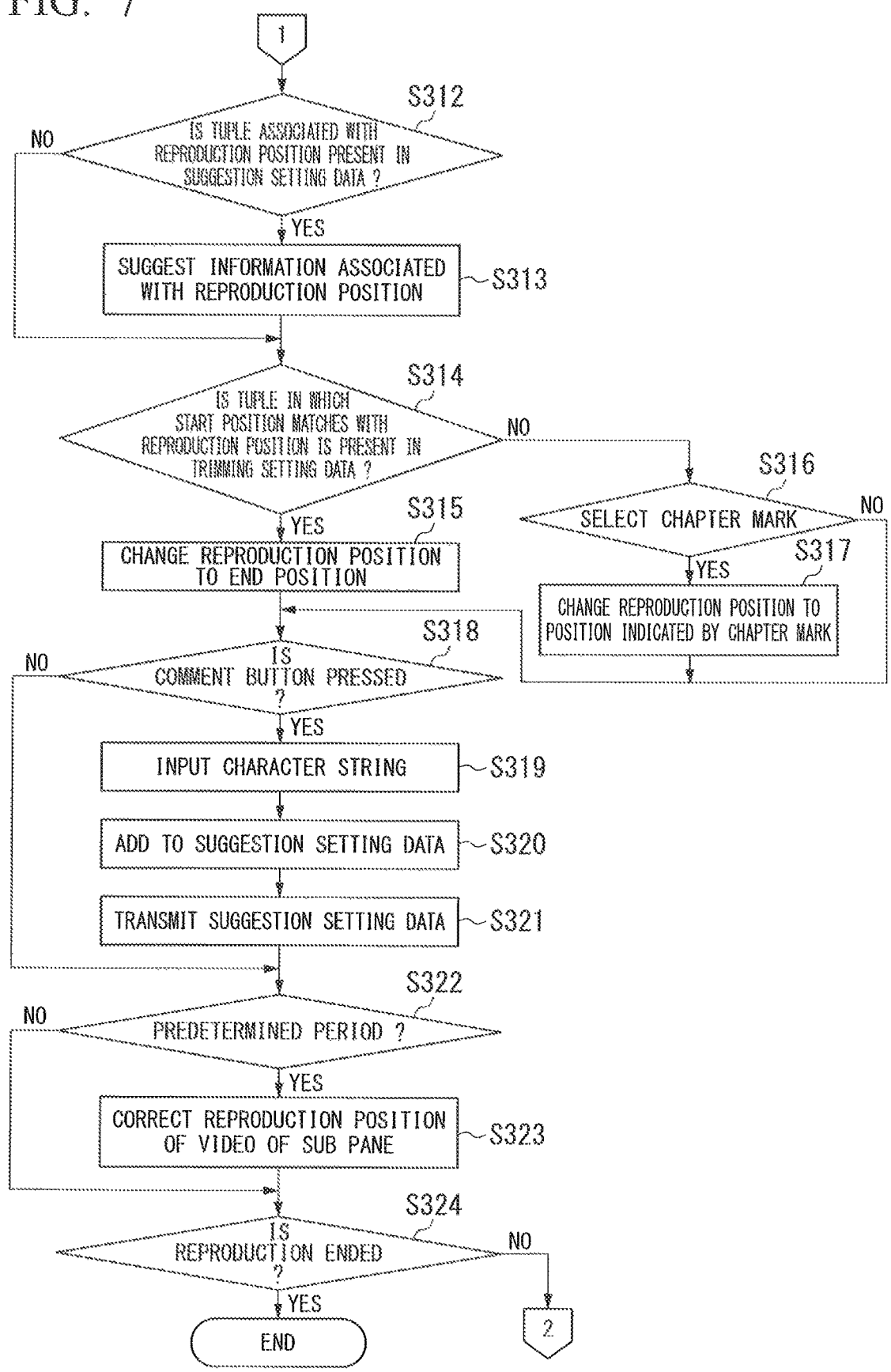
FIG. 7 is a second flowchart showing the reproduction processing of the training data according to the first embodiment.

FIG. 6 is a first flowchart showing the reproduction processing of the training data according to the first embodiment FIG. 7 is a second flowchart showing the reproduction processing of the training data according to the first embodiment.

In a case where the instructor presses the reproduction start button F4 of the instructor terminal 10 by the operation of the mouse 12, the reproduction unit 110 starts the reproduction of each video included in the training data (step S301). The display control unit 102 displays the reproduction screen shown in FIG. 3 on the display device 11 (step S302). In addition, the display control unit 102 displays a cursor on the reproduction screen on the basis of the operation of the mouse 12 included in the training data (step S303). Therefore, an operation of the cursor by the instructor may be displayed on the display device 11 with the video.

The reproduction switching unit 111 determines whether or not a tuple associated with a current reproduction position is present in the switching setting data included in the training data (step S304). In a case where the tuple associated with the current reproduction position is present in the switching setting data (step S304: YES), the reproduction switching unit 111 determines whether or not the prohibition of the automatic switching is set by the switching permission or prohibition setting unit 113 (step S305). In a case where the prohibition of the automatic switching is not set by the switching permission or prohibition setting unit 113 (step S305: NO), the reproduction switching unit 111 switches the video reproduced on the main pane P1 to the video indicated by the identification information associated with the current reproduction position of the switching setting data among the videos reproduced on the sub pane P2 (step S306). On the other hand, in a case where the tuple associated with the current reproduction position is not present in the switching setting data (step S304: NO) and in a case where the prohibition of the automatic switching is set by the switching permission or prohibition setting unit 113 (step S305: YES), the reproduction switching unit 111 does not perform the switching of the video reproduced on the main pane P1.

Next, the reproduction switching unit 111 determines whether or not the sub pane P2 is selected by the operation of the mouse 12 (step S307). In a case where the sub pane P2 is selected by the operation of the mouse 12 (step S307: YES), the reproduction switching unit 111 switches the video reproduced on the main pane P1 to the video reproduced on the selected sub pane P2 (step S308). On the other hand, in a case where the sub pane P2 is selected by the operation of the mouse 12 (step S307: NO), the reproduction switching unit 111 does not perform the switching of the video reproduced on the main pane P1.

Next, the reproduction unit 110 determines whether or not the tuple associated with the current reproduction position is present in the speed setting data included in the training data (step S309). In a case where the tuple associated with the current reproduction position is present in the speed setting data (step S309: YES), the reproduction unit 110 determines whether or not the prohibition of the automatic speed change is set by the speed change permission or prohibition setting unit 114 (step S310). In a case where the prohibition of the automatic speed change is not set by the speed change permission or prohibition setting unit 114 (step S310: NO), the reproduction unit 110 changes the reproduction speeds of each video to a reproduction speed associated with the current reproduction position of the switching setting data (step S311). On the other hand, in a case where the tuple associated with the current reproduction position is not present in the speed setting data (step S309: NO) and in a case where the prohibition of the automatic speed change is set by the speed change permission or prohibition setting unit 114 (step S310: YES), the reproduction unit 110 does not change the reproduction speed of the video.

Next, the information suggestion unit 118 determines whether or not the tuple associated with the current reproduction position is present in the suggestion setting data included in the training data (step S312). In a case where the tuple associated with the current reproduction position is present in the suggestion setting data (step S312: YES), the information suggestion unit 118 suggests the information associated with the current reproduction position according to the kind associated with the current reproduction position (step S313). Specifically, in a case where the kind of the information is the "comment", the information suggestion unit 118 displays the information associated with the current reproduction position as a character string on the main pane P1 of the reproduction screen. In a case where the kind of the information is the "narration", the information suggestion unit 118 converts the information associated with the current reproduction position into sound and outputs the sound. On the other hand, in a case where the tuple associated with the current reproduction position is not present in the speed setting data (step S302: NO), the information suggestion unit 118 does not suggest information.

Next, the reproduction position change unit 112 determines whether or not a tuple in which the start position matches the current reproduction position is present in the trimming setting data included in the training data (step S314). In a case where the tuple in which the start position matches the current reproduction position is present in the trimming setting data (step S314: YES), the reproduction position change unit 112 changes the reproduction positions of each video to an end position of the tuple (step S315). In a case where the tuple in which the start position matches with the current reproduction position is not present in the trimming setting data (step S314: NO), the reproduction position change unit 112 determines whether or not a chapter mark O3 is selected by the operation of the mouse 12 (step S316). In addition, in a case where the cursor is placed on the chapter mark O3 by the operation of the mouse 12, a character string associated with the chapter mark O3 in the chapter setting data is displayed on the reproduction screen. In a case where the chapter mark O3 is selected (step S316: YES), the reproduction position change unit 112 changes the reproduction positions of each video to a reproduction position indicated by the chapter mark O3 (step S317). In a case where the tuple in which the start position matches with the current reproduction position is not present in the trimming setting data and the chapter mark O3 is not selected (step S316: NO), the reproduction position change unit 112 does not change the reproduction position of the video.

Next, the reproduction control data generation unit 107 determines whether or not a comment button F6 is pressed by the operation of the mouse 12 (step S318). In a case where the comment button F6 is pressed (step S318: YES), the reproduction control data generation unit 107 receives the input of the character string indicating the information to be suggested by the operations of the mouse 12 and the keyboard 13 (step S319). In a case where the information to be suggested is input, the reproduction control data generation unit 107 adds the tuple that associates the input information, the current reproduction position, and the kind indicating the "comment" with one another to the suggestion setting data (step S320). In addition, the training data transmission unit 108 transmits the suggestion setting data to which the tuple is added to the database 20 (step S321).

On the other hand, in a case where the comment button F6 is not pressed (step S318: NO), the reproduction control data generation unit 107 does not add the tuple to the suggestion setting data.

Next, the reproduction position correction unit 117 determines whether or not the current time is a time corresponding to a predetermined period at which the video is to be corrected (step S322). In a case where the current time is the time corresponding to the predetermined period at which the video is to be corrected (step S322: YES), the reproduction position correction unit 117 corrects the reproduction positions of each video displayed on the sub pane P2 to the current reproduction position of the video displayed on the main pane P1 (step S323). On the other hand, in a case where the current time is not the time corresponding to the predetermined period at which the video is to be corrected (step S322: NO), the reproduction position correction unit 117 does not perform the correction processing of the reproduction position.

Next, the reproduction unit 110 determines whether the reproduction of the video is ended (step S324). In a case where the reproduction stop button F5 is pressed or in a case where the reproduction position reaches an end of the video, the reproduction unit 110 determines that the reproduction of the video is ended. In a case where the reproduction of the video is not ended (step S324: NO), the instructor terminal 10 returns to the processing of step S304 and continues the reproduction of the video. On the other hand, in a case where the reproduction of the video is ended (step S324: YES), the instructor terminal 10 ends the reproduction processing.

<<Constitution of Trainee Terminal>>

Figure 8:
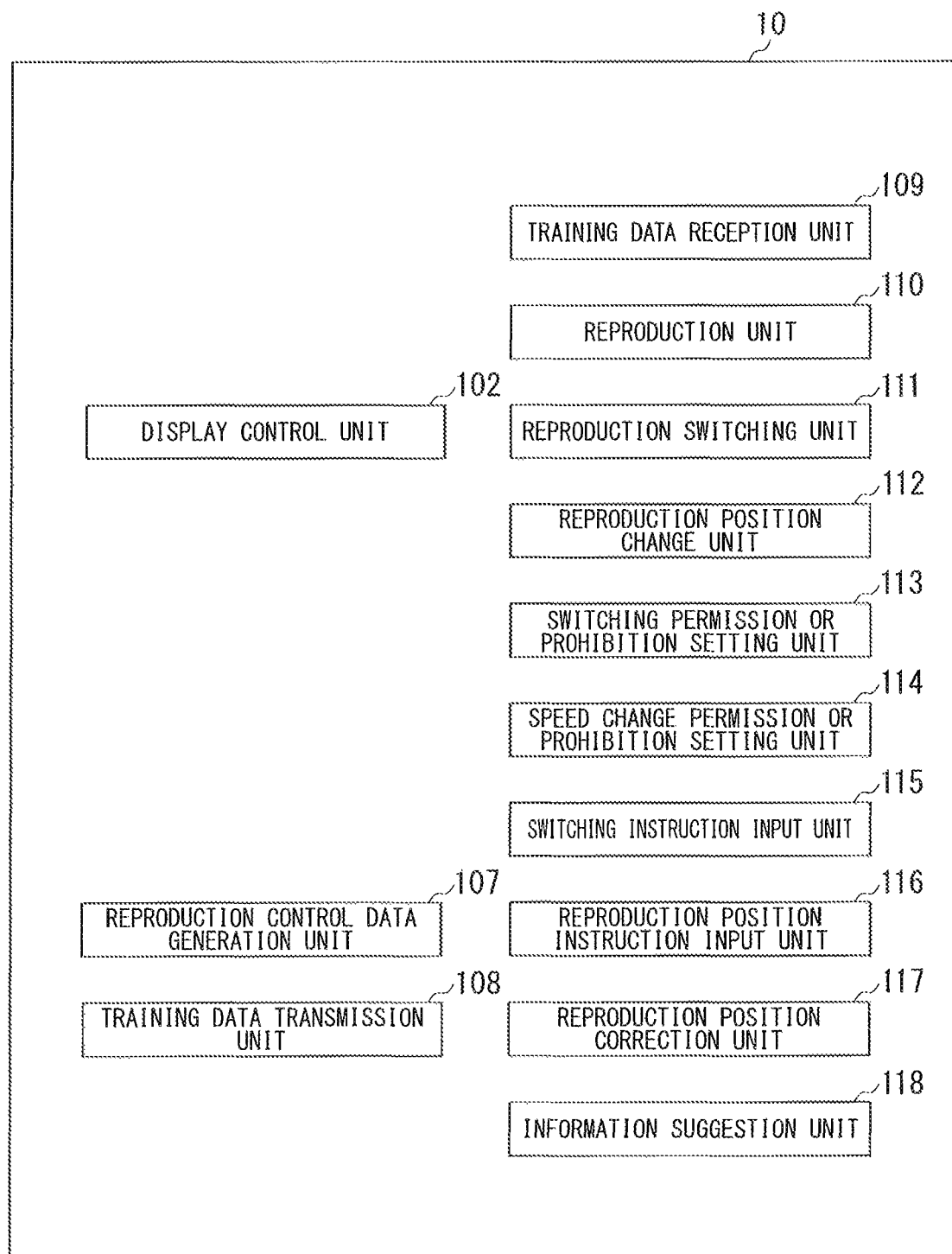
FIG. 8 is a schematic block diagram showing a software constitution of a trainee terminal according to the first embodiment.

FIG. 8 is a schematic block diagram showing a software constitution of the trainee terminal according to the first embodiment.

The trainee terminal 30 includes a display control unit 102, a reproduction control data generation unit 107, a training data transmission unit 108, a training data reception unit 109, a reproduction unit 110, a reproduction switching unit 111, a reproduction position change unit 112, a switching permission or prohibition setting unit 113, a speed change permission or prohibition setting unit 114, a switching instruction input unit 115, a reproduction position instruction input unit 116, a reproduction position correction unit 117, and an information suggestion unit 118. That is, the trainee terminal 30 does not have the functions corresponding to the simulator 101, the operation target switching unit 103, the recording unit 104, the log acquisition unit 105, and the mouse operation recording unit 106 included in the instructor terminal 10.

Figure 9:
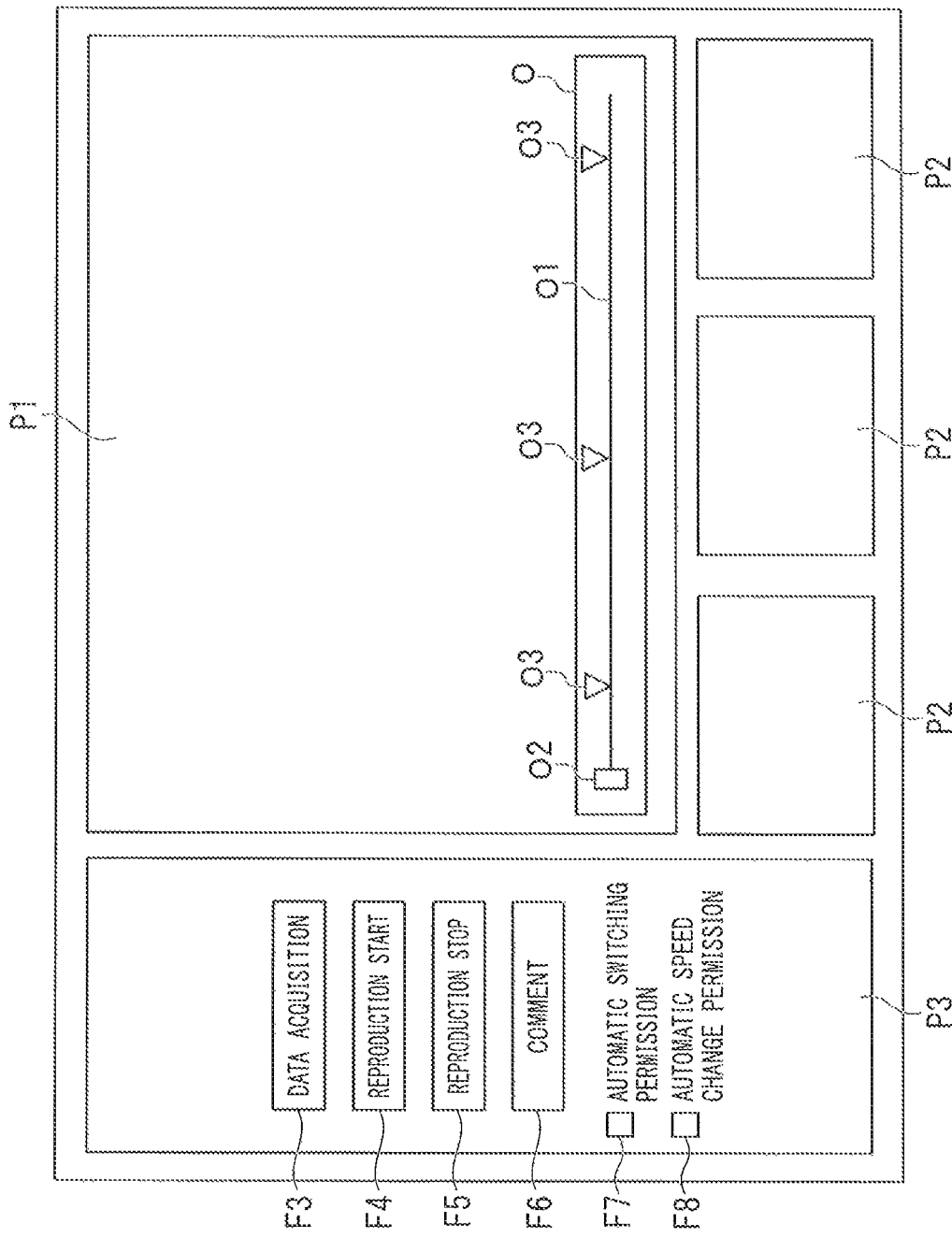
FIG. 9 is a diagram showing an example of an operation screen displayed on a display device of the trainee terminal according to the first embodiment.

FIG. 9 is a diagram showing an example of an operation screen displayed on a display device of the trainee terminal according to the first embodiment.

Similarly to the display device 11, a reproduction screen including a main pane P1, a plurality of sub panes P2, an operation pane P3, and a seek bar O is displayed on the display device 31.

In the operation pane P3 of the display device 31, a data acquisition button B3, a reproduction start button F4, a reproduction stop button F5, a comment button F6, an automatic switching permission check box F7, and an automatic speed change permission check box F8 are included. That is, in the operation pane P3 of the display device 31, the recording start button F1, the recording stop button F2, and the edition button F9 are not included.

As described above, the trainee terminal 30 is a terminal that executes reproduction processing of the training data and does not execute training data generation processing and editing processing. In addition, since the trainee terminal 30 includes the reproduction control data generation unit 107 and the training data transmission unit 108 and displays the comment button F6 on the display device 31, the trainee can add a comment to the training data. Therefore, the training system 1 enables the instructor and other trainees to share a question item by the trainee.

<<Effect>>

As described above, the instructor terminal 10 and the trainee terminal 30 synchronously reproduce different videos recorded in the same time zone on each of the main pane P1 and the sub pane P2 of the reproduction screen and switch the video reproduced on the main pane P1 to the video reproduced on the sub pane P2 during the reproduction of the video. Therefore, the instructor terminal 10 and the trainee terminal 30 enable the user to observe each video in detail.

In addition, the instructor terminal 10 and the trainee terminal 30 switch the video of the main pane P1 on the basis of the switching setting data. That is, the instructor terminal 10 and the trainee terminal 30 display the video designated by the instructor at the reproduction position designated by the instructor on the main pane P1. Therefore, the instructor terminal 10 and the trainee terminal 30 can display a video indicating an operation target to which the instructor wants to pay attention on the main pane P1.

In addition, the instructor terminal 10 and the trainee terminal 30 set the permission or prohibition of the switching of the video by the operation of the mouse 12 or the mouse 32. Therefore, the trainee can display a video other than the video designated by the instructor on the main pane P1.

In addition, the instructor terminal 10 and the trainee terminal 30 switch the video of the main pane P1 on the basis of the switching instruction of the video by the instructor or the trainee. Therefore, the instructor terminal 10 and the trainee terminal 30 can display a video indicating an operation target to which the instructor or the trainee wants to pay attention on the main pane P1.

In addition, the instructor terminal 10 and the trainee terminal 30 change the reproduction positions of the video reproduced on the main pane P1 and the video reproduced on the sub pane P2 to the reproduction position designated by the trimming setting data. Therefore, the instructor terminal 10 and the trainee terminal 30 can reproduce the video excluding an unimportant portion.

In addition, the instructor terminal 10 and the trainee terminal 30 change the reproduction speed of the video reproduced on the main pane P1 and the video reproduced on the sub pane P2 on the basis of the speed setting data. Therefore, the instructor terminal 10 and the trainee terminal 30 can reproduce the video by rapidly feeding an unimportant portion.

In addition, the instructor terminal 10 and the trainee terminal 30 change the reproduction positions of the video reproduced on the main pane P1 and the video reproduced on the sub pane P2 to the reproduction position designated by the chapter setting data. Therefore, the instructor terminal 10 and the trainee terminal 30 can reproduce the video from the reproduction position desired by the trainee.

In addition, the instructor terminal 10 can generate the chapter setting data that changes the reproduction position of the video to the reproduction position corresponding to the time at which the simulator 101 outputs the predetermined log data. Therefore, the instructor terminal 10 and the trainee terminal 30 can change the reproduction position of the video to the reproduction position corresponding to the time at which the simulator 101 outputs the predetermined log data. Thus, the trainee can check the video from the reproduction position at which the predetermined event occurs in the virtual plant.

In addition, a pointer related to the operation of the simulator 101 is displayed on the reproduction screens of the instructor terminal 10 and the trainee terminal 30. Therefore, the trainee can check the operation of the simulator 101 by the instructor by viewing the reproduction screen.

In addition, the instructor terminal 10 and the trainee terminal 30 correct the reproduction position of the video reproduced on the sub pane P2 to the reproduction position of the video reproduced on the main pane P1. Therefore, it is possible to prevent a deviation in the reproduction positions of each video due to a factor such as processing load. In addition, it is possible to prevent the reproduction of the video on the main pane P1 from becoming discontinuous by correcting the reproduction position of the video reproduced on the sub pane P2.

In addition, the instructor terminal 10 and the trainee terminal 30 suggest the information during the reproduction of the video on the basis of the suggestion setting data. Therefore, the instructor terminal 10 and the trainee terminal 30 can suggest the comment by the instructor, the question item by the trainee, and other information.

Another Embodiment

Although the embodiment has been described in detail with reference to the drawings, specific constitutions are not limited to those described above, and various design changes and the like are possible.

For example, the video according to the above-described embodiment is the video generated by recording the execution screen of the simulator 101; however, the invention is not limited thereto. For example, a video according to the other embodiment may be a video captured by different imaging devices at the same time zone.

In addition, the training system 1 according to the above-described embodiment includes the instructor terminal 10 and the trainee terminal 30; however, the invention is not limited thereto. For example, the training system 1 according to the other embodiment may not include the trainee terminal 30. In this case, the trainee performs the training using the instructor terminal 10. In addition, for example, in the other embodiment, in a case where the training data is recorded in the database 20 in advance, the training system 1 may not include the instructor terminal 10.

In addition, the instructor terminal 10 and the trainee terminal 30 according to the above-described embodiments switch the video of the main pane P1 an the basis of the switching setting data and the operation of the user, however, the invention is not limited thereto. For example, the instructor terminal 10 or the trainee terminal 30 according to the other embodiment may not perform the switching of the video based an the switching setting data or the operation of the user.

In addition, the instructor terminal 10 and the trainee terminal 30 according to the above-described embodiment change the reproduction position on the basis of the trimming setting data and the chapter setting data; however, the invention is not limited thereto. For example, the instructor terminal 10 or the trainee terminal 30 according to the other embodiment may not change the reproduction position based on the trimming setting data or the chapter setting data. In addition, the instructor terminal 10 or the trainee terminal 30 according to the other embodiment may change the reproduction position by the operation of the seek bar regardless of the trimming setting data.

In addition, the instructor terminal 10 and the trainee terminal 30 according to the above-described embodiments change the reproduction speed of the video on the basis of the speed setting data; however, the invention is not limited thereto. For example, the instructor terminal 10 or the trainee terminal 30 according to the other embodiment may not change the reproduction speed of the video.

In addition, the instructor terminal 10 and the trainee terminal 30 according to the above-described embodiment display the pointer on the reproduction screen on the basis of the operation history of the mouse 12; however, the invention is not limited thereto. For example, the instructor terminal 10 according to the other embodiment may record a video including the pointer and the instructor terminal 10 and the trainee terminal 30 may display the video.

In addition, the instructor terminal 10 and the trainee terminal 30 described above correct the reproduction position of the video reproduced on the sub pane P2 to the reproduction position of the video reproduced on the main pane P1; however, the invention is not limited thereto. For example, the instructor terminal 10 or the trainee terminal 30 according to the other embodiment may correct the reproduction positions of all videos or may not correct any reproduction position.

In addition, the instructor terminal 10 and the trainee terminal 30 described above suggest the information during the reproduction of the video on the basis of the suggestion setting data; however, the invention is not limited thereto. For example, the instructor terminal 10 or the trainee terminal 30 according to the other embodiment may not suggest a comment or a message.

In addition, the plurality of sub panes P2 are provided on the reproduction screen of the instructor terminal 10 and the trainee terminal 30 described above; however, the invention is not limited thereto. For example, in a case where there are two videos to be reproduced on a reproduction screen in the other embodiment, one sub pane P2 may be provided on the reproduction screen.

<Computer Constitution>

Figure 10:
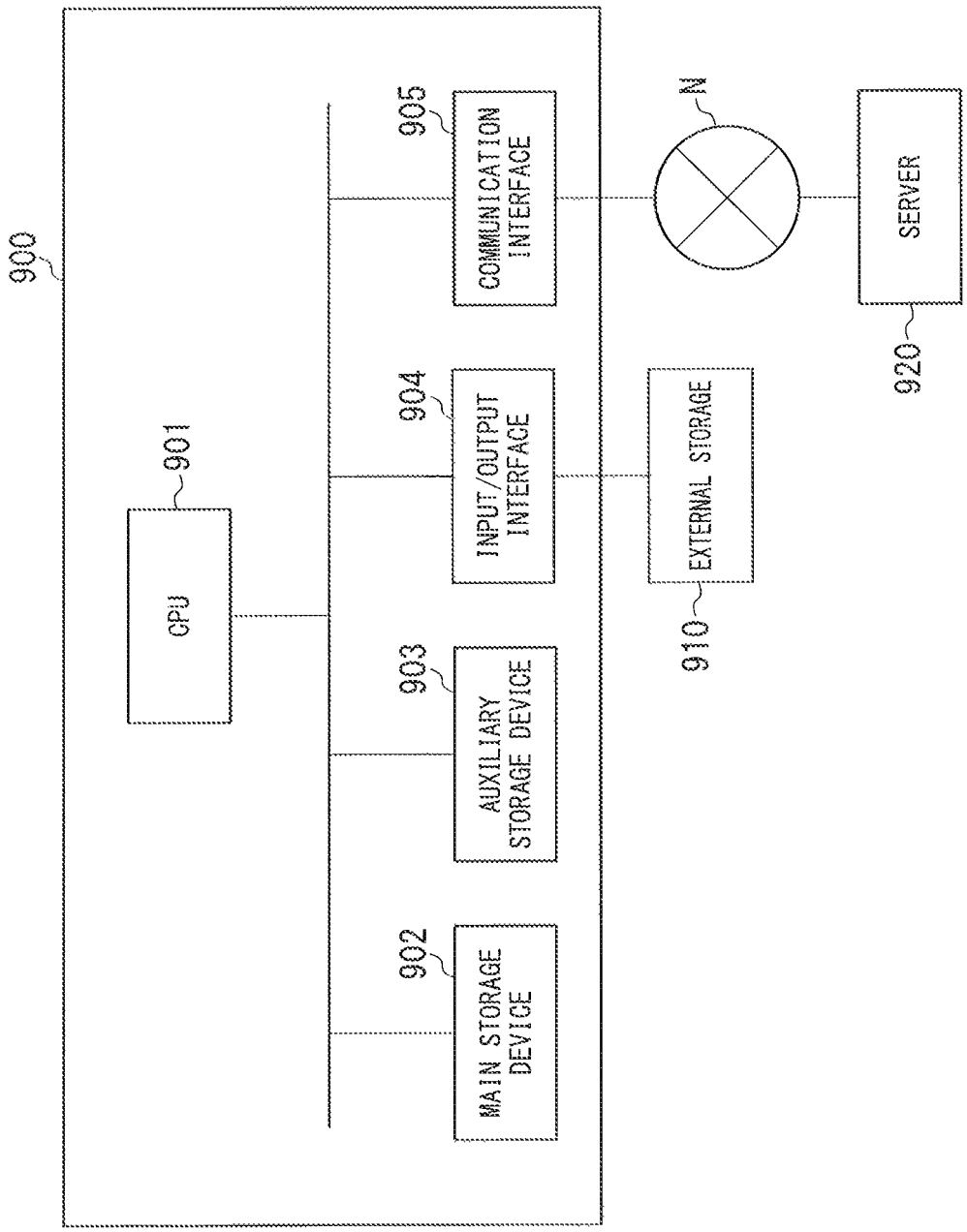
FIG. 10 is a schematic block diagram showing a constitution of a computer according to at least one embodiment.

FIG. 10 is a schematic block diagram showing a constitution of a computer according to at least one embodiment.

The computer 900 includes a CPU 901, a main storage device 902, an auxiliary storage device 903, an input/output interface 904, and a communication interface 905.

The terminal main body 15 and the terminal main body 35 are mounted on the computer 900. In addition, the operations of each processing unit described above are stored in the auxiliary storage device 903 in a form of a program. The CPU 901 reads the program from the auxiliary storage device 903, develops the program in the main storage device 902, and executes the above-described processing according to the program.

In addition, in at least one embodiment, the auxiliary storage device 903 is an example of a non-transitory tangible medium. Other examples of the non-transitory tangible medium include an external storage 910 connected through the input/output interface 904 and a server 920 connected through the communication interface 905. Examples of the external storage 910 include an optical disk, a magnetic disk, a magneto-optical disk, a semiconductor memory, and the like.

In a case where the program is distributed from the server 920 to the computer 900 through the network N, the computer 900 receiving the distribution may develop the program in the main storage device 902 and execute the above-described processing.

In addition, the program may be for realizing some of the above-described functions. Further, the program may be a difference file (a difference program) that realizes the above-described function in combination with another program already stored in the auxiliary storage device 903. For example, a program for causing the computer 900 to realize a simulator function and a program for causing the computer 900 to realize a search function may be separate programs.

In addition, in the other embodiment, at least some of the simulator 101, the display control unit 102, the operation target switching unit 103, the recording unit 104, the log acquisition unit 105, the mouse operation recording unit 106, the reproduction control data generation unit 107, the training data transmission unit 108, the training data reception unit 109, the reproduction unit 110, the reproduction switching unit 111, the reproduction position change unit 112, the switching permission or prohibition setting unit 113, the speed change permission or prohibition setting unit 114, the switching instruction input unit 115, the reproduction position instruction input unit 116, the reproduction position correction unit 117, and the information suggestion unit 118 may be included in the server 920, and an execution result thereof may be distributed to the computer 900. That is, the instructor terminal 10 or the trainee terminal 30 may be realized by a cloud computing system or a grid computing system. For example, in the other embodiment, each application executed by the simulator 101 may be executed by different servers 920.

INDUSTRIAL APPLICABILITY

According to at least one of the above-described aspects, the video reproduction device enables a user to observe each video in detail by reproducing each video reproduced on the sub pane on the main pane.

REFERENCE SIGNS LIST

1 Training system
10 Instructor terminal
20 Database
30 Trainee terminal
101 Simulator
102 Display control unit
103 Operation target switching unit
104 Recording unit
105 Log acquisition unit
106 Mouse operation recording unit
107 Reproduction control data generation unit
108 Training data transmission unit
109 Training data reception unit
110 Reproduction unit
111 Reproduction switching unit
112 Reproduction position change unit
113 Switching permission or prohibition setting unit
114 Speed change permission or prohibition setting unit
115 Switching instruction input unit
116 Reproduction position instruction input unit
117 Reproduction position correction unit
118 Information suggestion unit
P1 Main pane
P2 Sub pane

The invention claimed is:

1. A video reproduction device comprising:
a reception unit configured to receive different videos recorded in the same time zone from a database;
a reproduction unit configured to synchronously reproduce each of the videos received by the reception unit;
a display control unit configured to cause a display device to display a reproduction screen that displays each of the videos reproduced by the reproduction unit on each of a main pane and a sub pane with a smaller size than the main pane, the reproduction screen having the main pane and the sub pane;
a reproduction switching unit configured to switch the video reproduced on the main pane to the video reproduced on the sub pane during reproduction of the video by the reproduction unit; and
a reproduction position change unit configured to change the reproduction position of the video reproduced on the main pane and the video reproduced on the sub pane by the reproduction unit to a designated reproduction position,
wherein the reproduction switching unit is configured to switch the video on the basis of switching setting data that associates a reproduction position at which the video reproduced on the main pane is switched to the video reproduced on the sub pane with a video that is a switching target,
wherein the video is a video obtained by capturing an execution screen of a simulator, and the reproduction position change unit changes the reproduction position of the video reproduced on the main pane and the video reproduced on the sub pane by the reproduction unit to a reproduction position corresponding to a time at which the simulator outputs predetermined log data.

2. The video reproduction device of claim 1, further comprising:
a reproduction position correction unit configured to correct the reproduction position of the video reproduced on the sub pane to the reproduction position of the video reproduced on the main pane.

3. The video reproduction device of claim 1, wherein the video includes a video obtained by capturing an operation screen of the simulator.

4. The video reproduction device of claim 1, wherein a pointer related to an operation of the simulator is displayed on the reproduction screen.

5. The video reproduction device of claim 1, further comprising:
a switching instruction input unit configured to receive an input of a switching instruction of the video by a user,
wherein, when the switching instruction is input to the switching instruction input unit, the reproduction switching unit switches between the video reproduced on the main pane and the video reproduced on the sub pane.

6. The video reproduction device of claim 1, further comprising:
an information suggestion unit configured to suggest information during the reproduction of the video by the reproduction unit on the basis of suggestion setting data that associates the suggested information with a reproduction position suggesting the information.

7. A video reproduction device comprising:
a reception unit configured to receive different videos recorded in the same time zone from a database;
a reproduction unit configured to synchronously reproduce each of the videos received by the reception unit;
a display control unit configured to cause a display device to display a reproduction screen that displays each of the videos reproduced by the reproduction unit on each of a main pane and a sub pane with a smaller size than the main pane, the reproduction screen having the main pane and the sub pane;
a reproduction switching unit configured to switch the video reproduced on the main pane to the video reproduced on the sub pane during reproduction of the video by the reproduction unit; and
a reproduction position change unit configured to change the reproduction position of the video reproduced on the main pane and the video reproduced on the sub pane by the reproduction unit to a designated reproduction position,
wherein the reproduction unit is configured to reproduce the video on the basis of speed setting data that associates a reproduction position at which reproduction speeds of the video reproduced on the main pane and the video reproduced on the sub pane are changed with a reproduction speed after the change,
wherein the video is a video obtained by capturing an execution screen of a simulator, and the reproduction position change unit changes the reproduction position of the video reproduced on the main pane and the video reproduced on the sub pane by the reproduction unit to a reproduction position corresponding to a time at which the simulator outputs predetermined log data.

8. A video reproduction device comprising:
a reception unit configured to receive different videos recorded in the same time zone from a database;
a reproduction unit configured to synchronously reproduce each of the videos received by the reception unit;
a display control unit configured to cause a display device to display a reproduction screen that displays each of the videos reproduced by the reproduction unit on each of a main pane and a sub pane with a smaller size than the main pane, the reproduction screen having the main pane and the sub pane;
a reproduction switching unit configured to switch the video reproduced on the main pane to the video reproduced on the sub pane during reproduction of the video by the reproduction unit; and
a switching permission or prohibition setting unit configured to set whether or not to switch the video by the reproduction switching unit,
wherein the reproduction switching unit is configured to switch the video on the basis of switching setting data that associates a reproduction position at which the video reproduced on the main pane is switched to the video reproduced on the sub pane with a video that is a switching target,
wherein, in a case where the switching permission or prohibition setting unit sets a prohibition of the switching, the reproduction switching unit does not switch between the video reproduced on the main pane and the video reproduced on the sub pane.

* * * * *